UNITED STATES PATENT OFFICE 2,358,366

HETEROCYCLIC SUBSTITUTED ARYL SULPHONAMIDO COMPOUNDS AND METHODS OF OBTAINING THE SAME

Benjamin F. Tullar, Grosse Pointe Woods, Mich., assignor to Parke, Davis & Company, Detroit, Mich., a corporation of Michigan No Drawing. Application May 14, 1941, Serial No. 393,414

5 Claims. (Cl. 260—239.6)

The invention relates to diphenyl sulphones having the general formula,

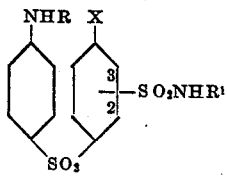

where R is a member of the group hydrogen and an organic carboxylic acyl radical, X is a member of the group $NO_2$ and $NH_2$, and $R^1$ is a pyridine group, a ring carbon atom of which is directly attached to the N atom of the —$SO_2$—NH— radical, the group —$SO_2NHR^1$ being attached to the aryl nucleus at one of the positions 2 and 3 as indicated in the above general formula.

The invention also relates to the preparation of certain intermediate compounds valuable not only for the preparation of the final products of the formula given above but also useful in the manufacture of compounds of related composition and usefulness. The compounds of the invention are useful as therapeutic agents, for example, as internal antiseptics and also serve as intermediates for the preparation of compounds having such properties.

The invention may be further illustrated by the following examples:

Example 1

25.5 g. of 2-chloro-5-nitrobenzene sulphonyl chloride are dissolved in 500 cc. of ethyl ether and added to a solution of 20 g. of α-aminopyridine in 300 cc. of ethyl ether. The mixture is stirred and allowed to stand for four hours, at the end of which time the ether is decanted from the semi-solid mass and the residue extracted with 1 liter of hot water. The washed residue is dried at about 100° C. and is a granular crystalline product which darkens and melts above about 300° C. It is α-(2-chloro-5-nitrobenzene-sulphonamido)-pyridine, which may also be designated as 2-chloro-5-nitrobenzene-sulphonamido-2'-pyridine. It has the following formula:

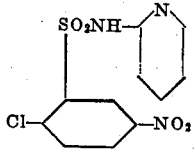

Example 2

14 g. of α-(2-chloro-5-nitrobenzene sulphonamido)-pyridine are mixed with 50 g. of p-acetaminobenzene sulphinic acid sodium salt and 1 liter of water made slightly acid with a small quantity of sulphinic acid is added and the mixture refluxed about four days. At the end of this time, the boiling hot solution is filtered to remove unchanged starting materials and the filtrate cooled to yield a gum which can be purified by solution in a suitable solvent, such as diacetone alcohol, and recrystallization therefrom. The yellow product is α-(4-acetamino-4'-nitro-diphenyl - sulphone - 2'-sulphonamido)-pyridine. It also decomposes when heated in the neighborhood of 300° C. The product of this example has the following formula,

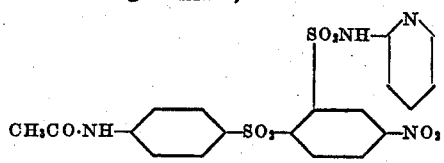

Example 3

(a) 75 g. of the potassium salt of 4,4'-dinitro-diphenyl sulphide-2-sulphonic acid, prepared by reaction of sodium para-nitro-thiophenolate and the potassium salt of 2-chloro-5-nitrobenzene sulphonic acid, are mixed with 150 g. of mossy tin, 250 cc. of concentrated hydrochloric acid and 250 cc. of water, and the mixture heated to start the evolution of hydrogen and the beginning of the reduction reaction which then proceeds quite rapidly. After about one-half hour, the tin compounds are precipitated from the reaction mixture by making the latter slightly alkaline with sodium hydroxide. The precipitated tin compound is filtered off, and the filtrate neutralized with acetic acid to cause the reduced product to precipitate out. The precipitate is filtered off. It is recrystallized from boiling water and dried and has a melting point of about 298° C. with decomposition. It is 4,4'-diamino-diphenyl-sulphide-2-sulphonic acid. The product analyzes approximately the theoretical required, when analyzed for sulphur and nitrogen.

(b) The product of 3(a) is oxidized and acetylated at the same time by the following method. 50 g. of 4,4'-diaminodiphenyl sulphide-2-sulphonic acid, prepared, for example, as described above, are dissolved in the equivalent amount of sodium hydroxide solution and evaporated to dryness and dried in vacuo to give the solid sodium salt. This is then mixed with 330 cc. of acetic acid and 80 cc. of acetic anhydride and the mixture heated to boiling to obtain a clear solution. The solution is cooled to 40° C. and 80 cc. of 30% hydrogen peroxide solution added. The mixture is heated for about 1 hour at 70 to 80° C. and then cooled to room temperature or slightly below room temperature. At this point the desired product begins to separate and precipitation is completed by adding about 1500 cc. of ether. The precipitate is filtered off and washed with several portions of ether and dried at 80° C. The dry product thus obtained is 4,4'-diacetamino-diphenyl sulphone-2-sulphonic acid sodium salt.

It was definitely demonstrated to be the compound mentioned by converting a portion to the free diamino acid melting at about 264° C. and analyzing for nitrogen and sulphur content. The analysis showed the acid to have substantially the percentages of nitrogen and sulphur required by theory.

(c) 37 g. of the diacetylamino-diphenyl-sulphone-2-sodium sulphonate of Example 3(b) are mixed with 50 g. of phosphorous pentachloride and the mixture heated for 1 hour on a steam bath until the mass becomes a homogeneous liquid and the evolution of hydrogenchloride slows down. The reaction mixture is poured into ice water with strong stirring, the precipitate filtered off and washed well with ice water and sucked dry on a suction filter. The solid product is then taken up in chloroform solution, separated from any water layer that is present and the chloroform solution dried with anhydrous sodium sulphate. The dry solution in chloroform is used directly for the reaction described under 3(d) below. However, the 4,4'-diacetamino-diphenylsulphone-2-sulphonyl chloride can be obtained by concentrating the solution to a small volume and cooling to crystallize it from solution, followed by filtration and drying.

(d) 30 g. of the diacetamino-diphenyl-sulphone-2-sulphonyl chloride of Example 3(c) are mixed with 13 g. of α-aminopyridine in 500 cc. of chloroform. This mixture is allowed to stand overnight and then is boiled for 30 minutes, the solution evaporated to dryness in vacuo and washed free of aminopyridine hydrochloride with water. The pyridine derivative thus obtained is purified by dissolving in alkali, filtering it from any insoluble material present and reprecipitating by neutralizing the alkaline solution with hydrochloric or other suitable mineral acid, whereupon pure 4,4'-diacetamino-diphenylsulphone-2-sulphonamido-pyridine separates out and is filtered off and dried.

(e) 20 g. of the sulphonamido pyridine product of Example 3(d) are added to 100 cc. of 10% sodium hydroxide solution and the mixture boiled 15 minutes, after which it is treated with decolorizing charcoal, filtered and the filtrate acidified to Congo red, while hot, with hydrochloric acid. Any undissolved impurities are filtered off at this point and the filtrate neutralized with dilute alkali hydroxide and then cooled. α-(4,4'-diaminodiphenylsulphone-2-sulphonamido)-pyridine crystallizes out upon cooling and is filtered off and recrystallized from 40% aqueous acetone. After treatment of the acetone solution with decolorizing charcoal, if necessary, the crystalline product is dried and has the melting point of about 215° C. and analyzes substantially the percentages of nitrogen, sulphur, carbon and hydrogen required by theory. The product therefore has the following formula,

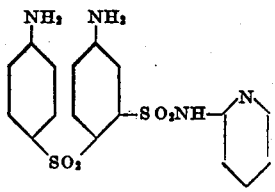

α-(4,4'-diamino diphenylsulphone - 2 - sulphonamido)-pyridine. (This compound may also be designated as 2-sulphanilyl-5-aminobenzene sulphonamido-2'-pyridine.)

The product of this example is an active internal antiseptic and can readily be prepared for use in aqueous solution. It can also be prepared as described under Example 4.

*Example 4*

(a) 195 g. of 4,4'-dinitro diphenyl sulphide-2-sulphonic acid potassium salt are dissolved in 1200 cc. of acetic acid and 250 cc. of acetic anhydride at 50° C. and 320 cc. of 30% hydrogen peroxide added. The mixture is heated at 70 to 80° C. for one hour and then cooled to 10° C. Ether is added and a heavy gelatinous mass precipitates out. It is filtered off, washed with ether and dried at 100° C. It is the potassium salt of 4,4'-dinitro diphenyl sulphone-2-sulphonic acid.

The free acid may be obtained from this salt by treatment of a concentrated aqueous solution of the salt with a strong mineral acid and then filtering and washing with ice water. The precipitated acid is dried at 100° C. and melts at approximately 285° C. with decomposition.

(b) 190 g. of potassium salt of 4,4'-dinitro diphenyl sulphone-2-sulphonic acid are mixed with 300 grams of phosphorus pentachloride and refluxed on a steam bath for one hour to a clear solution which is then poured into a liter of ice and water mixture. The desired sulphonic acid chloride is filtered off and freed from phosphoric acid and other more soluble inorganic materials by washing with cold water. The moist acid chloride is dissolved in a solvent such as ethyl acetate or chloroform, the water layer is drawn off and the solution in the organic solvent dried with $CaCl_2$ or anhydrous calcium sulphate. The solvent is evaporated at low pressure until crystallization of the pure acid chloride begins. The solution is cooled further, filtered and the precipitate washed with low boiling petroleum ether and dried at 50° C. The product is 4,4'-dinitro diphenyl sulphone-2-sulphonyl chloride and melts at about 172° C. Its composition can be determined by percentage analysis for nitrogen and sulphur or by treating it with ammonia and reducing the dinitro sulphone sulphonamide thus formed to convert the two nitro groups to amino groups. The diamino product is 4,4'-diamino diphenyl sulphone-2-sulphonamide melting at 236° C. identical with the product of Example 1(d) of my copending application, Serial No. 351,151, filed August 3, 1940.

(c) 20 g. of sulphonyl chloride from Example 4(b) are taken up in somewhat more than the necessary volume of ethyl acetate to completely dissolve the same and then mixed with 10 grams of α-amino-pyridine in ethyl acetate solution. The mixture is boiled and evaporated to dryness over a period of about one hour, the solid residue washed with water to remove any unchanged α-aminopyridine, dried, taken up in hot 70% dioxane or acetone, the solution treated with decolorizing charcoal, filtered, cooled, and the crystals filtered off and dried at 60° C. This product is α-(4,4'-dinitro-diphenylsulphone-2-sulphonamido)-pyridine melting at about 150° C.

(d) 25 grams of α-(4,4'-dinitro-diphensylsulphone-2-sulphonamido)-pyridine are dissolved in 200 cc. of 70% aqueous dioxane and added to 2 liters of hot water containing about 10 cc. of glacial acetic acid. 50 grams of reduced iron powder are added with vigorous stirring and while heating to about 90° C. The heating and stirring are continued for several hours, at the end of which time the reaction mixture is made alkaline to phenolphthalein with alkali hydroxide and filtered from the iron sludge. The filtrate is acidified with acetic acid and the precipitate which forms is filtered off and redissolved in 40% aqueous acetone, the solution heated and mixed with decolorizing charcoal while hot and filtered. The filtrate is cooled and pure α-(4,4'-diamino diphenylsulphone-2-sulphonamido)-pyridine crystallizes out and is filtered off and dried at 100° C. It melts at 215° C. and is identical with the final product described above under Example 3(e).

While I have given several specific embodiments of the invention in the above examples, it is to be understood that the invention is not limited thereto but includes other equivalent modifications. For example, although α-amino-pyridine is used as an amino-substituted heterocycle in the above examples, it is to be understood that other amino-substituted heterocyclic compounds may be similarly reacted to form other heterocyclic substituted amino diphenylsulphone sulphonamido compounds coming within the scope of the invention.

What I claim as my invention is:

1. A compound having the formula,

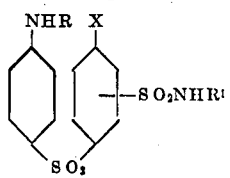

where R is a member of the group hydrogen and organic carboxylic acyl radicals, X is a member of the group NO₂ and NH₂ and R¹ is a pyridine group a ring carbon atom of which is directly attached to the N atom of the —SO₂—NH— radical, and the group —SO₂NHR¹ is attached to the aryl nucleus at one of the positions 2 and 3.

2. A compound of the formula,

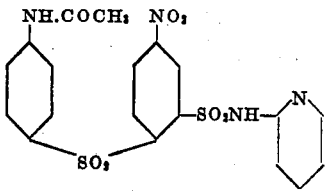

3. A compound of the formula,

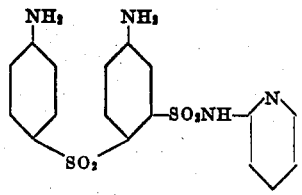

4. Process for preparing a 4,4'-diamino-diphenylsulphone-2-sulphonamido-pyridine which comprises oxidizing a 4,4'-dinitro-diphenylsulphide-2-sulphonic acid alkali metal salt to an alkali salt of 4,4'-dinitrodiphenylsulphone-2-sulphonic acid, converting the latter by means of a halogenating agent into a 4,4'-dinitro-diphenylsulphone-2-sulphonyl halide, reacting the sulphonyl halide with the amino group of an amino-pyridine to obtain a 4,4'-dinitro-diphenylsulphone-2-sulphonamido-pyridine and reducing the nitro groups of the latter with production of 4,4'-diamino-diphenylsulphone-2-sulphonamido-pyridine.

5. Process for preparing α-(4,4'-diamino-diphenylsulphone-2-sulphonamido)-pyridine which comprises oxidizing 4,4'-dinitro-diphenylsulphide-2-sulphonic acid sodium salt to the sodium salt of 4,4'-dinitro-diphenylsulphone-2-sulphonic acid, converting the latter by means of phosphorus pentachloride into 4,4'-dinitro-diphenylsulphone-2-sulphonyl chloride, reacting the sulphonyl chloride with α-amino-pyridine to obtain α-(4,4'-dinitro-diphenylsulphone-2-sulphonamido)-pyridine and reducing the nitro groups of the latter with production of α-(4,4'-diamino-diphenylsulphone-2-sulphonamido)-pyridine.

BENJAMIN F. TULLAR.